UNITED STATES PATENT OFFICE.

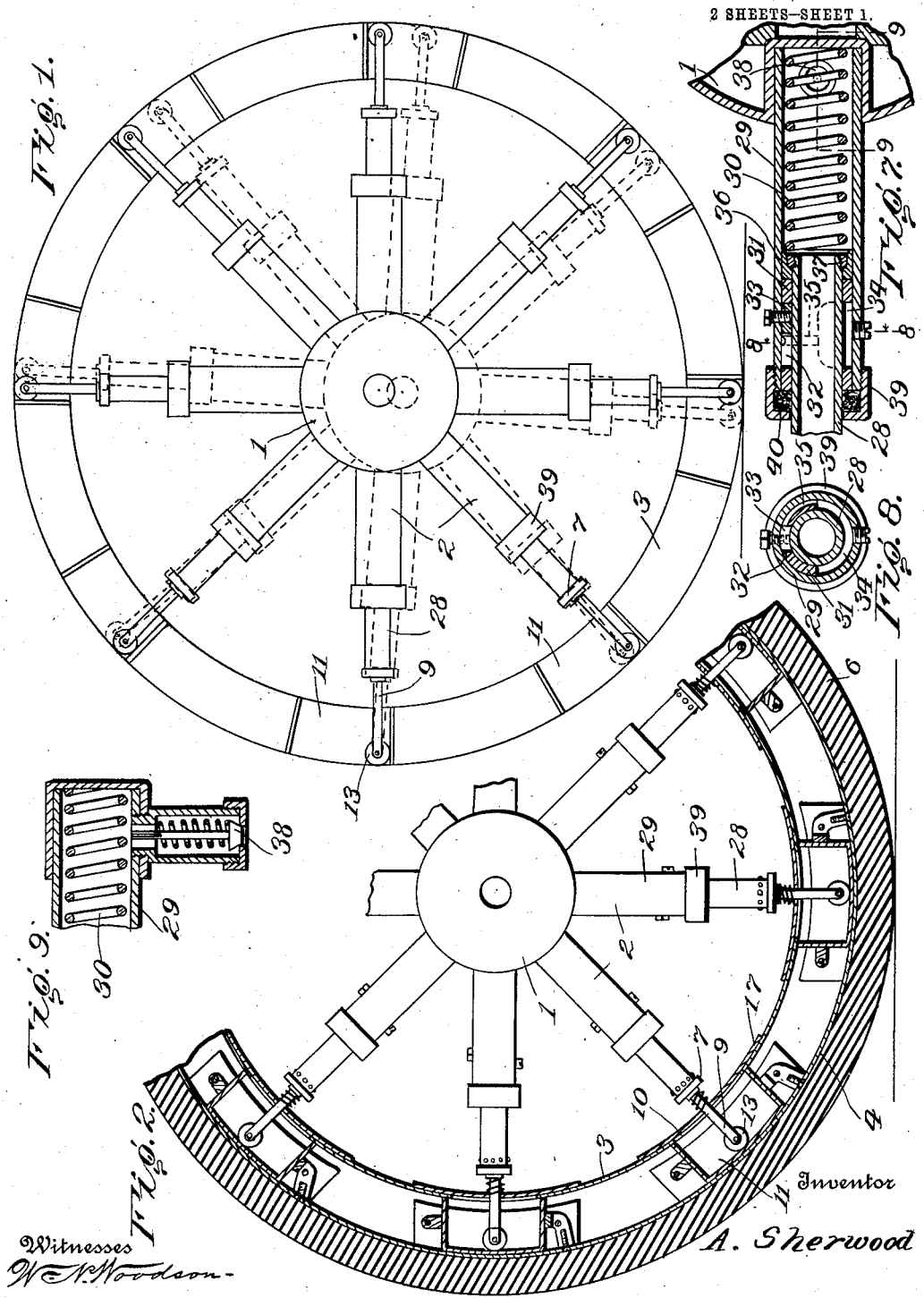

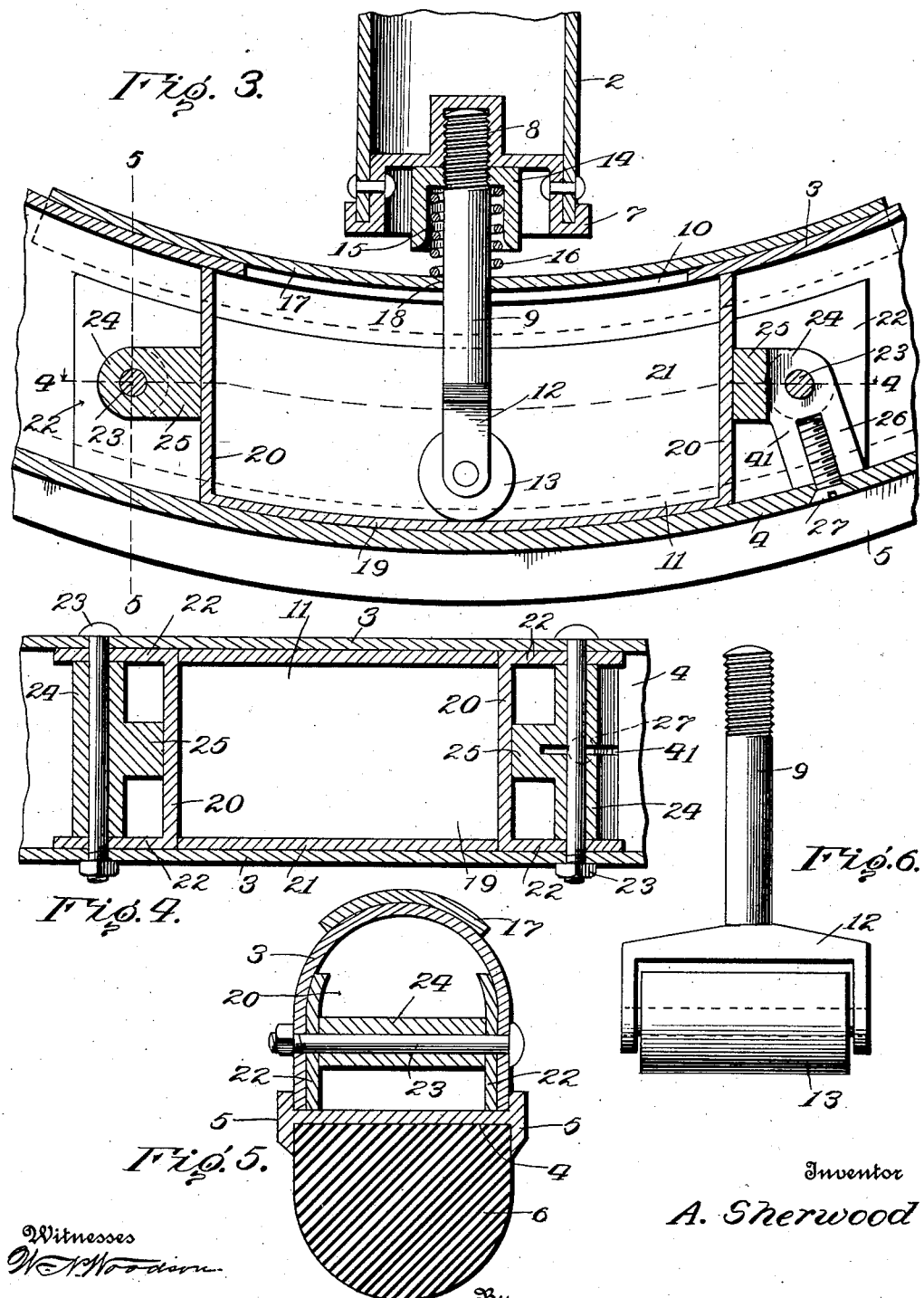

ARTHUR SHERWOOD, OF PLANTSVILLE, CONNECTICUT.

RESILIENT WHEEL.

1,022,885. Specification of Letters Patent. Patented Apr. 9, 1912.

Application filed January 24, 1911. Serial No. 604,447.

*To all whom it may concern:*

Be it known that I, ARTHUR SHERWOOD, citizen of the United States, residing at Plantsville, in the county of Hartford and State of Connecticut, have invented certain new and useful Improvements in Resilient Wheels, of which the following is a specification.

The present invention comprehends certain new and useful improvements in resilient wheels for use on automobiles and other vehicles, and the object of the invention is to provide an improved wheel embodying the improved telescopic spokes described and claimed in my co-pending application, Serial No. 463,936, filed November 21, 1908, allowed October 10, 1910.

Another object of the invention is to provide means for connecting the spokes to the rim so as to permit the former to have limited circumferential movement relative to the latter, whereby to afford the spokes a maximum spring action and to cause the weight of the load to be thoroughly distributed among all of the spokes of the lower half of the wheel.

A still further object of the invention is to provide a wheel of this character which is reliable and efficient in operation and will absorb locally the shocks incident to travel, which obviates the use of the ordinary pneumatic tire, and which possesses certain other advantages that will become apparent as the description proceeds.

I attain these objects by the structure illustrated in the accompanying drawing, in which:

Figure 1 is a diagrammatic view illustrating the operation of my improved wheel; Fig. 2 is a fragmentary longitudinal section of the wheel; Fig. 3 is an enlarged longitudinal section illustrating in detail the connection between a spoke and the rim; Fig. 4 is a section on the line 4—4 of Fig. 3, the foot being omitted; Fig. 5 is a transverse section on the line 5—5 of Fig. 3; Fig. 6 is a detail view of the foot detached; Fig. 7 is a fragmentary longitudinal section of a spoke; Fig. 8 is a transverse section on the line 8—8 of Fig. 7, and, Fig. 9 is a fragmentary sectional view showing the valve at the inner end of the spoke, the section being taken on the line 9—9 of Fig. 7.

Corresponding and like parts are referred to in the following description and indicated in all the views of the drawing by the same reference characters.

My improved wheel consists, broadly, of a hub 1, a series of spring-actuated telescopic spokes 2, and a rim 3. The rim has a channeled formation and is preferably U-shape in cross section and faces away from the hub of the wheel. The space between the edges of the rim is closed by a metallic tire 4 having inwardly projecting side flanges 5 which overlap the outer faces of the sides of the rim and thus retain the tire against lateral displacement. If desired, the metallic tire may be surrounded by a solid rubber tire 6, in which instance the side flanges are extended outwardly to confine the rubber tire in place.

As hereinbefore premised, the spokes are connected to the rim in a novel manner. To this end, each spoke has a cap 7 secured to its outer end, the cap being formed with a central threaded socket 8 into which is threaded a foot 9 that projects outwardly in the direction of the length of the spoke. The foot passes through a slot 10 in the inner wall of the rim, and is received within a pocket 11 which is provided within the rim. The foot is bifurcated at its outer end, as indicated at 12, and has a cylindrical roller 13 journaled between its bifurcations. This roller bears against the bottom of the pocket so as to cause the spoke to support the rim from the hub. The slot 10 is elongated circumferentially and extends substantially throughout the entire length of the pocket to permit the foot to operate between the end walls of the pocket. By this means the spoke is afforded limited circumferential movement relative to the rim, for a purpose to be hereinafter disclosed. In order to lock the foot in position with the roller extending transversely of the pocket so as to roll freely in the direction of the circumference of the wheel, a jam nut 14 is threaded on the foot and bears against the cap 7, as shown. The nut is formed in its outer end with a recess 15 for the reception of a coil spring 16 which encircles the foot 9 and bears against a cover plate 17. The cover plate is formed with a central opening 18 that is just of sufficient size to permit the foot to pass therethrough. The spring 16 expands against the cover plate and holds the same against the inner surface of the rim for the purpose of closing the slot 10 to exclude dirt and other foreign matter from the pocket 11. The cover plate moves back and forth with the foot and is considerably longer than the pocket so as to maintain the slot closed at all times. The cover plate is preferably curved transversely, as shown, to partially embrace the rim, this being important in order to cause the cover plate to seat evenly on the rim and to be guided in its circumferential movement relative thereto. It will be noted that the coil spring 16 also serves the additional function of preventing the nut 14 from becoming accidentally backed off from the cap.

The pocket 11 is formed separate from the rim and is suitably mounted therein. The pocket comprises a bottom wall 19, end walls 20 and side walls 21. The roller 13 contacts with and travels over the bottom wall, and this wall is suitably curved to fit against the inner surface of the metallic tire 4. The end walls 20 extend transversely between the side walls of the rim of the wheel and are spaced apart circumferentially any desired distance, the distance being governed by the amount of play which is to be afforded between the parts. The side walls of the pocket fit between the end walls and against the inner faces of the sides of the rim. At each end, the pocket is formed with a pair of transversely spaced ears 22 that are preferably extended angularly from the end walls 20. The ears lie against the inner faces of the sides of the rim, through-bolts 23 being inserted through the rim and ears, whereby to removably mount the pocket in place. A sleeve 24 encircles each through-bolt and is interposed between the ears to prevent the rim and the ears from being subjected to excessive strain upon the tightening of the bolt. The sleeve is formed with a lateral extension 25 that projects toward the pocket and has a flat terminal face abutting against the adjacent end wall of the pocket to reinforce the wall against the force of repeated impacts from the roller 13. As both ends of the pocket are thus effectually braced, the danger of the end walls becoming spread apart in the operation of the wheel, is reduced to a minimum. The sleeve at one end of the pocket is also formed with a second extension 26 that projects outwardly and bears against the inner surface of the metallic tire 4. Screws 27 are countersunk in the tire 4 and are threaded into the respective extensions 26 to secure said parts together. The pocket will, of course, be subjected to most of the wear resulting from the movement of the foot back and forth therein. However, by removably mounting the pocket within the rim, as above described, the pocket is rendered susceptible of being readily detached and replaced by a new part when worn out.

Attention is also directed to the fact that the pocket may be stamped from sheet metal in blank form and may be bent into the desired shape, this being a very important item since it materially decreases the cost of manufacture.

While the invention is of sufficient scope to admit of the use of any suitable longitudinally extensible and collapsible spokes, I preferably employ spokes of the type described and claimed in my co-pending application hereinbefore referred to. Each spoke consists of separate tubular sections 28 and 29, the former being connected at its outer end to the rim of the wheel and the latter being fitted at its inner end in a socket in the hub 1. The section 28 is of smaller diameter than the other section and telescopes therewith. A coiled expansion spring 30 acts on the sections to yieldably maintain the same extended. The section 28 has a sleeve or piston 31 encircling its inner end and rigidly secured thereto, the piston fitting snugly to the interior wall of the section 29. A longitudinal slot or groove 32 is formed in the periphery of the piston and receives a block or other suitable device 33 which is carried by the section 29. The block operates in the slot to guide the sections in their telescopic movement and to limit the extent of such movement. As the block fits snugly between the side walls of the slot, the sections are positively held against relative turning or twisting movement. The piston is also recessed in its periphery to provide a chamber 34 for containing oil or other suitable lubricant. The lubricant is conducted from the chamber through a peripheral groove or passage 35 into the slot 32, whereby to reduce the friction between the walls of the slot and the block 10. By virtue of the fact that both the chamber 34 and the passage 35 open outwardly through the periphery of the piston, the contacting surfaces of the piston and the section 29 are kept well lubricated at all times and hence the telescopic movement of the sections is facilitated. The lubricant is introduced into the chamber 34 through a filling port that extends through the section 29 and is closed by a removable plug.

A packing washer 36 encircles the inner end of the tube 28 in contact with the inner end of the piston 31, and is held in place by a nut 37 engaging the inner extremity of said tube. The expansion spring 30 is inclosed within the section 29 with one end abutting against the washer 36 and with its other end resting against the hub. The washer bears against the inner surface of the section 29 to maintain an air-tight joint between the sections. As the cap 7 closes the outer end of the section 28 and the hub closes the inner end of the section 29, a positive column of air will be confined within the spoke. The air column resists the compression of the spoke and in this way renders the structure quite resilient. An air port is formed in proximity to the inner end of the spoke section 29 and is controlled by a spring-pressed valve 38 of conventional form, the valve being normally closed to prevent the escape of air from the interior of the spoke and being arranged to open automatically to admit air when the pressure of the air within the spoke is decreased to a certain extent through leakage or the like. Threaded on the outer end of the section 29 is a cap nut 39 which fits snugly around the periphery of the section 28 behind the piston 31. The cap nut contains packing 40 which forms a yielding abutment for the piston when the tubes are extended, thereby absorbing the shock incident to the operation of the spoke. The packing 40 also assists in providing a tight joint between the telescopic sections of the spoke.

In practice, if the wheel is driven when there is no weight on it, all of the rollers are forced against the front ends of the pocket to turn the rim. If power is applied suddenly or the rim offers great resistance to the power, the results are the same. But when a load is put on the wheel, the hub of the wheel settles down a little. The load forcing down the hub causes the hub and the spokes connected thereto to move in an arc of a circle with the roller bearing against the front wall of the pocket in the upper portion of the lower front quarter of the wheel, as a center or fulcrum. (See Fig. 1). Thus all of the rollers are thrown away from the front ends of the pockets, with the exception of the roller of the spoke in the upper portion of the lower front quarter of the wheel, which spoke serves to drive the rim. It is, of course, apparent that the rollers nearest the center of arcuate movement of the hub and spokes, are moved a less distance than the others. When the wheel is rotated the rollers successively assume positions in the lower front quarter of the wheel and bear against the front ends of the corresponding pockets, so that the fulcrum point shifts from one roller to the next. In this manner there is always one of the rollers in position at the front end of one of the pockets, one spoke at a time forming the driving connection between the hub and the rim. Hence the yielding action of the wheel is accomplished through the medium of the longitudinally yieldable spokes, and the pockets which enable the hub and spokes to turn in an arc of a circle about the driving roller as a center. As the hub is forced down, it causes a compression of the air in the lower spokes and a drawing in of air in the upper spokes. Consequently it follows that there will be a denser and more effective air cushion on account of the hub going down a little and thus drawing in air through the inlet valves, than would otherwise be obtained.

It is to be understood that either the air cushion or the spring may constitute the main agent for rendering the spoke resilient, but the former is preferred. Attention is also directed to the fact that the extension 26 and the sleeve 24 may be split as indicated at 41 in order to exert a clamping force on the screw 27 by and upon the tightening of the corresponding bolt 23. This forms a very simple and efficient lock for retaining the screw against accidental displacement.

What I claim is:

A resilient wheel including a hub, hollow spoke sections fixed thereto, spoke sections slidably received within the first mentioned spoke sections, feet carried at the outer ends of the last mentioned spoke sections and provided with rollers, a hollow rim having at its inner side openings through which the said feet project, the rollers carried by the feet bearing against the outer portion of the rim, plates mounted upon the feet and located over the said openings in the rim, and springs carried by the feet and bearing against the plates to hold the same in close contact with the inner side of the rim.

In testimony whereof, I affix my signature in presence of two witnesses.

ARTHUR SHERWOOD.

Witnesses:
   Boughton T. Noble,
   George G. Westerberg.